United States Patent
To et al.

(10) Patent No.: US 7,459,938 B2
(45) Date of Patent: Dec. 2, 2008

(54) METHOD AND APPARATUS FOR POWER EFFICIENT AND SCALABLE MEMORY INTERFACE

(75) Inventors: Hing Yan To, Folsom, CA (US); Joe Salmon, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/518,297

(22) Filed: Sep. 8, 2006

(65) Prior Publication Data
US 2007/0079034 A1 Apr. 5, 2007

Related U.S. Application Data

(62) Division of application No. 10/982,632, filed on Nov. 5, 2004, now Pat. No. 7,243,176.

(51) Int. Cl.
*H03K 19/094* (2006.01)
(52) U.S. Cl. .............................. 326/83; 326/87; 326/62; 326/30
(58) Field of Classification Search ................ 326/30, 326/86, 62–68, 80–88
See application file for complete search history.

(56) References Cited

U.S. PATENT DOCUMENTS

| | | | |
|---|---|---|---|
| 5,264,958 A | 11/1993 | Johnson | |
| 6,243,776 B1 | 6/2001 | Lattimore et al. | |
| 6,329,837 B1 * | 12/2001 | Whitworth et al. | 326/30 |
| 6,493,351 B1 | 12/2002 | Shideler | |
| 6,531,896 B1 * | 3/2003 | Song | 326/86 |
| 6,625,163 B1 | 9/2003 | Shideler et al. | |
| 6,703,866 B1 | 3/2004 | Arimilli et al. | |
| 6,812,736 B2 | 11/2004 | Best et al. | |
| 6,831,480 B1 | 12/2004 | Shumarayev et al. | |
| 6,894,505 B2 | 5/2005 | Gohel | |
| 6,990,618 B1 | 1/2006 | Lulla et al. | |
| 7,124,221 B1 * | 10/2006 | Zerbe et al. | 710/106 |
| 2002/0180480 A1 | 12/2002 | Dreps et al. | |
| 2004/0057525 A1 | 3/2004 | Rajan et al. | |

OTHER PUBLICATIONS

U.S. Appl. No. 10/982,632, Office action dated Oct. 27, 2006.
"Samtec Q-Pairs(TM) Connectors Combine Differential & Single Ended Systems for High-Speed & Density", ThomasNet Press Release,(Jan. 1, 2002), all.
Compaq, et al., "Universal Serial Bus Specification", Revision 1.1,(Sep. 23, 1998), 107-154.

* cited by examiner

*Primary Examiner*—Vibol Tan
*Assistant Examiner*—Jany Tran
(74) *Attorney, Agent, or Firm*—Blakely, Sokoloff, Taylor & Zafman LLP (57) ABSTRACT

Transmission of digital signals across a bus between an electronic device having a transmitter and another electronic device having a receiver with termination for both the transmitter and receiver being referenced to ground, such that the electronic device having the transmitter and the other electronic device having the receiver are able to be powered with differing decoupled voltages, such that the voltage employed by the electronic device having the transmitter is able to be lower than the voltage employed by the other electronic device having the receiver, and wherein the electronic device having the transmitter may transmit addresses and/or commands to the other device having the receiver using single-ended signaling, while both electronic devices may exchange data using differential signaling.

5 Claims, 9 Drawing Sheets

METHOD AND APPARATUS FOR POWER EFFICIENT AND SCALABLE MEMORY INTERFACE

CROSS-REFERENCE TO RELATED APPLICATIONS

This application is a divisional of patent application Ser. No. 10/982,632, filed on Nov. 5, 2004 now U.S. Pat. No. 7,243,176, entitled "Method and Apparatus for Power Efficient and Scalable Memory Interface.

BACKGROUND

Increasing the speed of operation of electronic devices, such as computer systems, requires increasing the speed of not only processors, digital logic and data storage components, but also the speed of buses used to couple such components together. However, increasing the speed of operation of a bus such that data is transferred across that bus more quickly often entails the use of combinations of transmitter and receiver circuit designs that consume more power. In some cases, this increased power consumption is the result of having to use components in transmitter and/or receiver circuits that have the desirable characteristic of being operated at higher speeds, but which require more power to switch so quickly between states needed to transfer a binary value of 0 or 1. In other cases, this increased power consumption is the result of having to couple together components that have the higher speed characteristic, but which interact with other needed components in ways that may create other undesirable conditions that must be overcome through the use of more power, such as higher parasitic capacitive loads. In still other cases, this increased power consumption is the result of combinations of transmitter and receiver design or referencing to voltage levels such that the transmitters and receivers are required to use the same voltage level as a power rail, even though the core voltage level at which one of the devices internally operates is a lesser voltage.

The fact that the speed of processor, support logic and data storage components have been increased while being necessarily based on differing semiconductor design and/or process technologies has also created voltage level incompatibility issues with processors and digital logic components typically being designed to operate at ever lower voltage levels (currently 1 volt or less), while data storage components, especially dynamic random access memory (DRAM) devices typically operate at higher voltages (currently 1.3 volts or higher). This mismatch in voltages arising from differing semiconductor process technologies typically results in processors and/or digital logic components having to employ transmitter circuit designs that not only transmit data across a bus to data storage components, but which also internally convert from the lower core voltage within a processor or digital logic component to a higher external voltage that matches the I/O voltage employed by a data storage component, because prior art transmitter and receiver circuits often do not work correctly unless both the transmitter and receiver circuits employ the same voltages, themselves. To support this conversion between voltages, a processor or digital logic component must be coupled to two different voltage rails, one for the core and the other for transmitters and/or receivers, must either use special high voltage tolerant transistors to handle the higher voltage within the lower voltage silicon technology which increases process technology costs through added process complexity, or use cascode transistor techniques to handle the higher voltage which increases costs through taking up more space on a silicon die. The detrimental effects of higher power consumption and higher silicon technology costs arising from such approaches where both transmitters and receivers are required to operate at the same higher voltage are incurred regardless of whether the signaling across a bus between transmitter and receiver circuits is entirely single-ended, entirely differential, or a mix of the single-ended and differential.

Figure 1A:
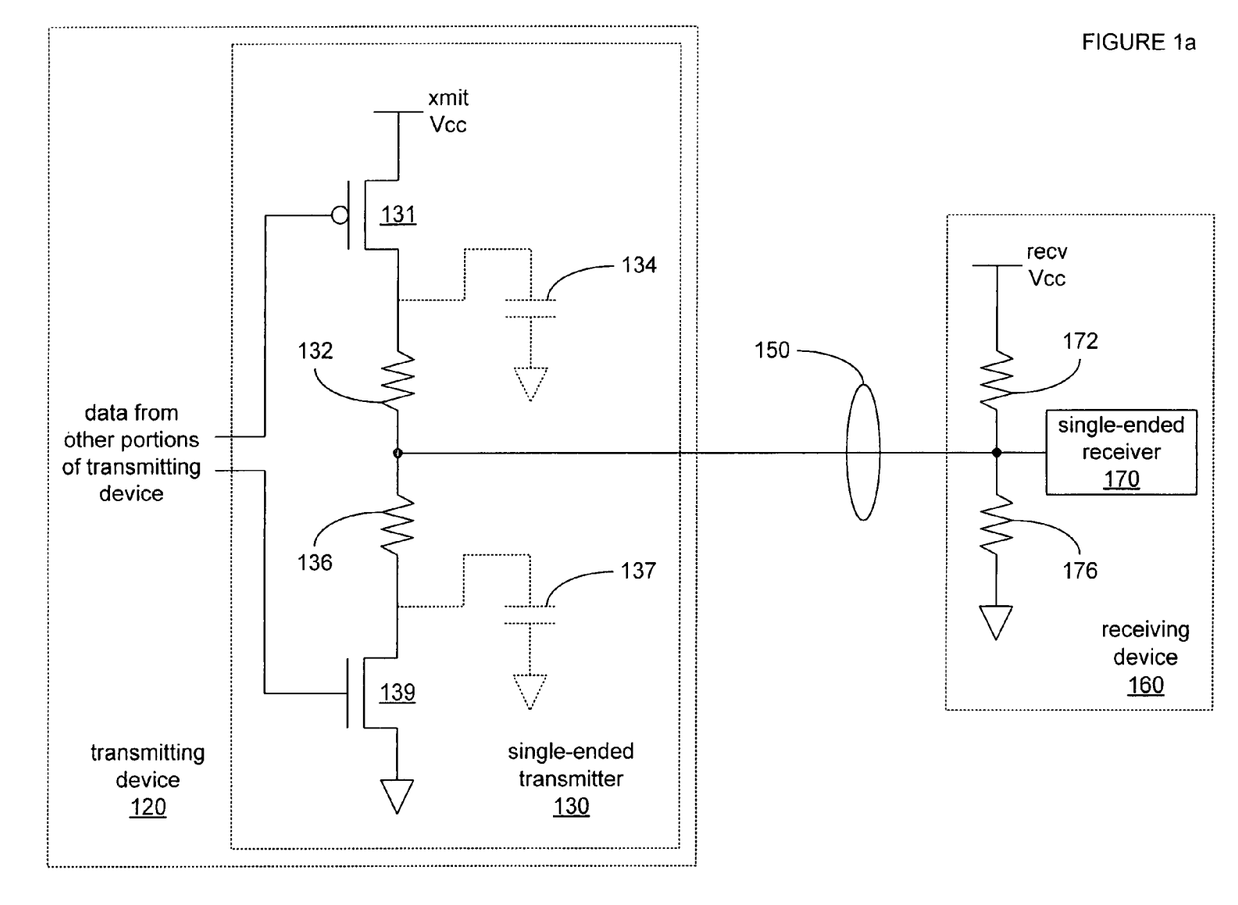
FIGS. 1a, 1b are 1c are schematic diagrams of portions of prior art transmitting and receiving devices making use of prior art transmitter and receiver circuits.
Figure 1B:
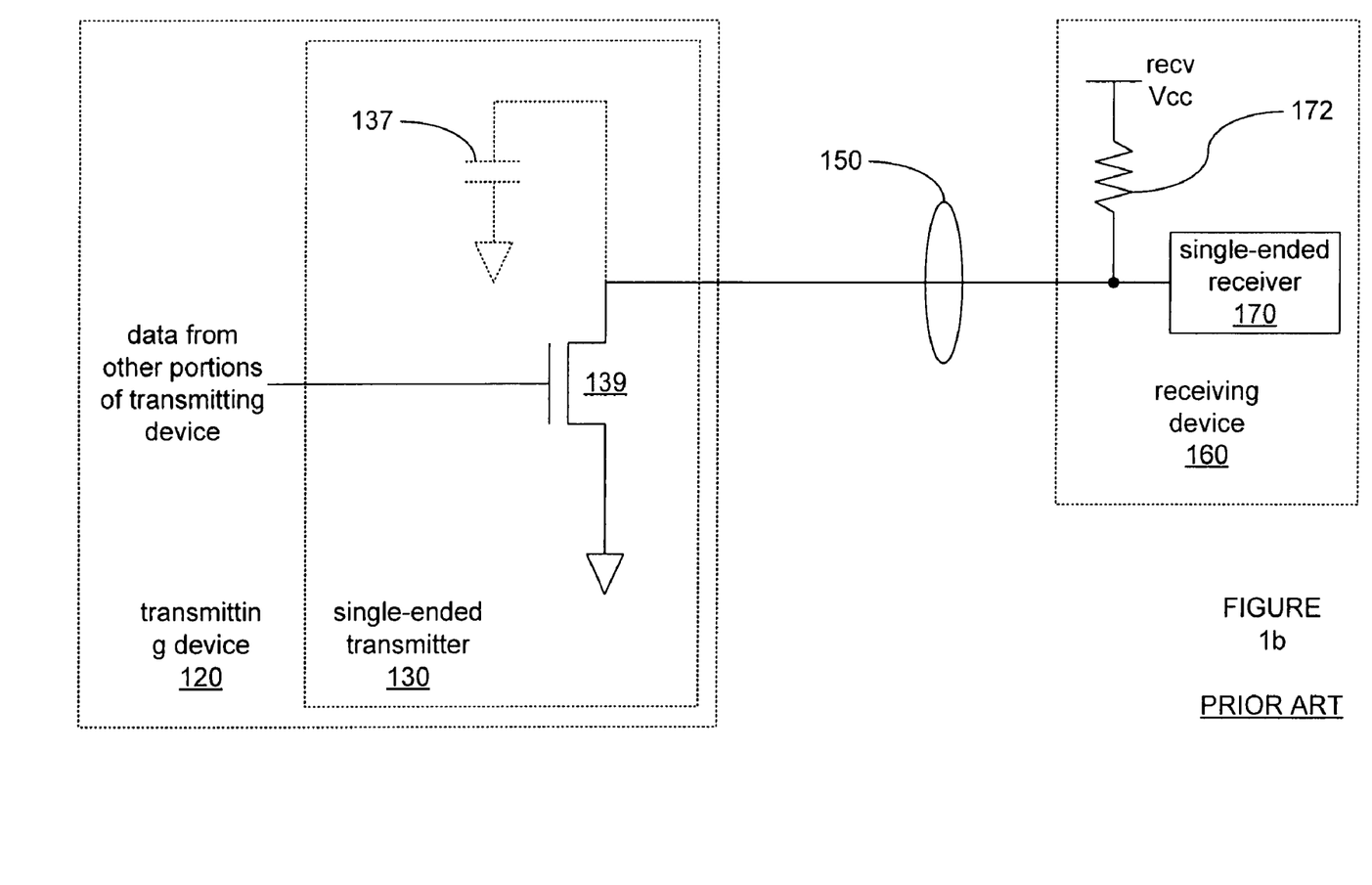
Figure 1C:
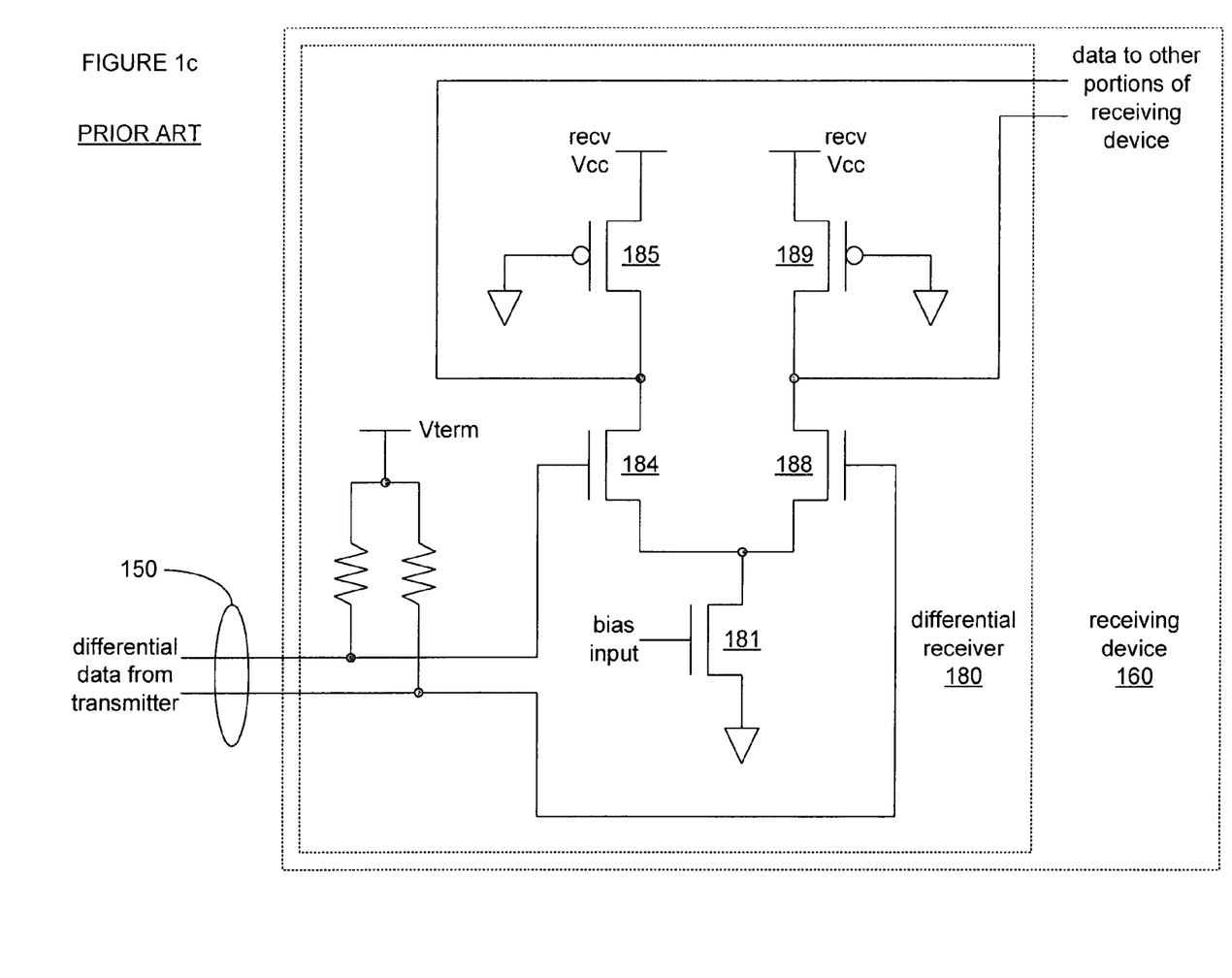

These difficulties with voltage level incompatibility in current practice are illustrated by FIGS. 1a, 1b and 1c depicting prior art transmitter and receiver circuit designs. It should be noted that although for the sake of simplicity of discussion, FIGS. 1a-c depict only unidirectional configurations, these same issues arise and apply to bidirectional configurations, as well. In FIG. 1a, transmitting device 120 (such as a memory controller IC) employs multiple ones of single-ended transmitter 130 (although only one is shown for sake of clarity) to transmit addresses, commands and/or data across bus 150 to single-ended receiver 170 employed by receiving device 160 (such as a memory IC). Switches 131 and 139 receive data from other portions of transmitting device 120 and drive either a high or low voltage level onto a signal line of bus 150 through resistors 132 and 136, respectively, while resistors 172 and 176 are employed by receiving device 160 to terminate this same signal line of bus 150, referencing receiver Vcc and ground, respectively, at or near the point at which this same signal line is coupled to the input of single-ended receiver 170. Capacitors 134 and 137 are parasitic capacitors, i.e., capacitive loads arising from the connection of switches 131 and 139 to this same signal line of bus 150, thereby slowing down the speed at which the signal state of this signal line may be changed in transmitting data. The presence of resistors 132 and 136 does mitigate this undesirable effect on this signal line, but only to a limited extent, since mitigation to a greater degree would require a higher resistance value which would, in turn, defeat the ability of switches 131 and 139 to drive this signal line. Also, it is common for single-ended transmitter 130 to be designed to conform to a specification of electrical characteristics for a signal line, including signal line 150, such that the resistance of resistors 132 and 136 is often dictated by such a specification, and therefore, cannot be changed. Another undesirable effect of this configuration of transmitter and receiver design is that transmitter Vcc and receiver Vcc must be of the same voltage level for high and low values that distinguish between binary 1 and 0 values to be correctly detected by single-ended receiver 170.

FIG. 1b depicts a somewhat different design for single-ended transmission of data from FIG. 1a, but despite the design differences, largely the same previously discussed problems are presented again. Capacitor 137 again depicts a parasitic capacitor on a signal line of bus 150, again slowing the speed at which the state of that signal line may be changed, and again, the configuration of transmitter and receiver design requires that transmitter Vcc, the receiver Vcc and the power rail to which termination may be coupled must all be of the same voltage level. The same difficulties would continue to exist even if transistor 139 were coupled to a transmitter Vcc and resistor 172 were coupled to ground. Furthermore, despite the depiction in FIG. 1c of a differential receiver in contrast to the use of single-ended configurations in FIGS. 1a and 1b, the same difficulty of differential receiver 180 needing to be supplied with a receiver Vcc that matches the same voltage level as supplied to whatever differential transmitter may drive the pair of signal lines received by differential receiver 180 from across bus 150 still exists.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern incorporating transmitter and/or receiver circuits into memory controllers and memory storage devices that support a mixture of single-ended and differential signaling across a memory bus, and/or support the use of different voltages by the transmitter and receiver circuits employed by a memory controller versus those employed by a memory storage device. Although at least part of the following discussion centers on the driving of signals within a memory system and across memory buses within a computer system, it will be understood that embodiments of the claimed invention may be practiced in support of a number of different types of electronic systems employing the transmission of digital signals across any of a number of forms of bus for any of a number of purposes.

Figure 2A:
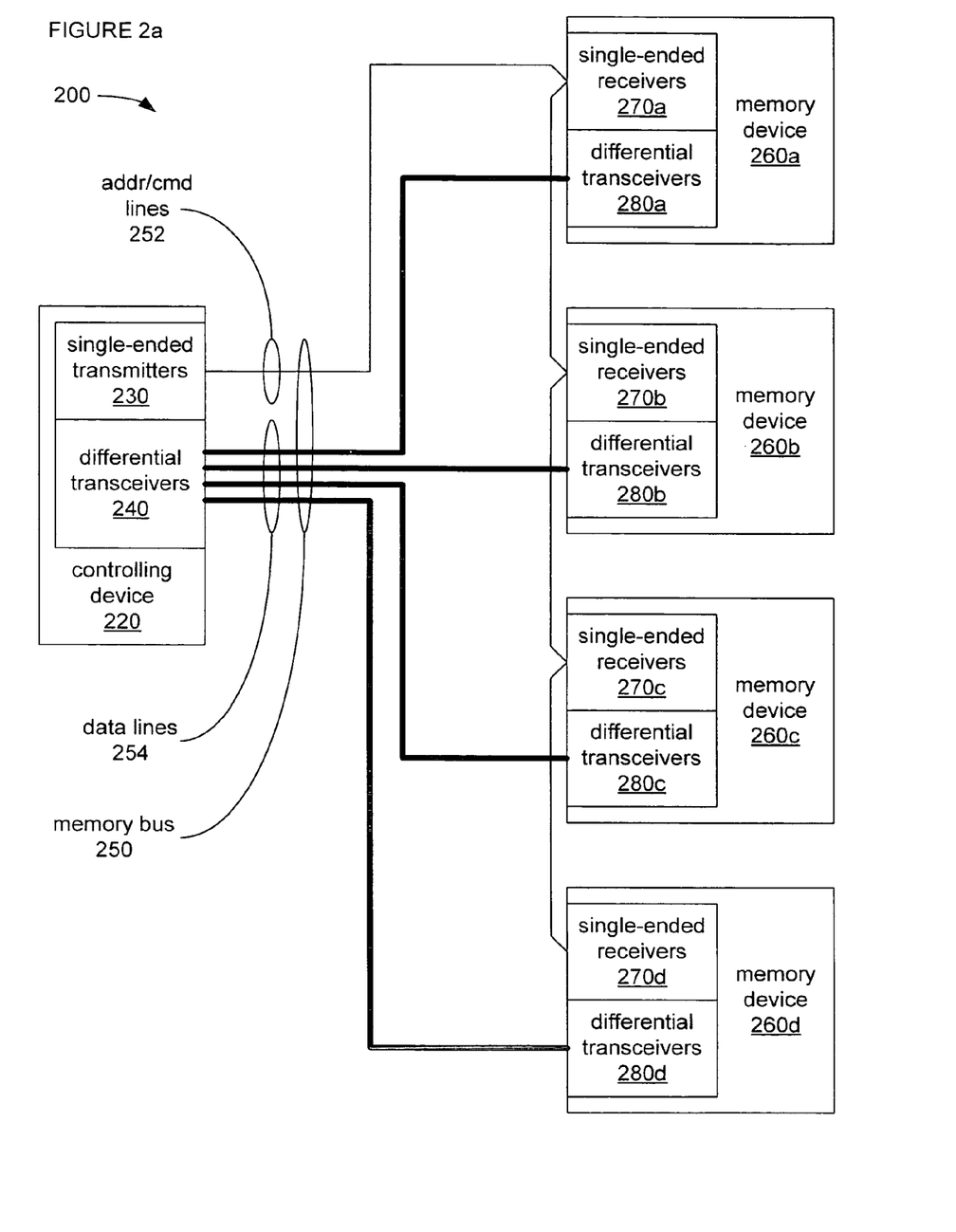
FIG. 2a is a block diagram of an embodiment of a memory system employing both single-ended bused signals and differential point-to-point signals.

FIG. 2a is a simplified block diagram of an embodiment of a memory system employing both single-ended bused signals and differential point-to-point signals. Memory system 200 is, at least in part, made up of controlling device 220, and memory devices 260a, 260b 260c and 260d. In some embodiments, memory system 200 is a portion of a larger electronic device, such as a computer system, memory devices 260a-d are either individual memory ICs or memory modules made up of multiple memory ICs, and controlling device 220 is among digital logic used at least to link one or more processors (not shown) to memory devices 260a-d to store and retrieve instructions and data for processing by one or more processors. In other embodiments, memory system 200 is implemented as a set of ICs soldered to a PCB making up a memory module, such as a SIMM, SIPP or DIMM, in which controlling device 220 provides buffering between memory devices 260a-d and at least one external bus (not shown) coupled to controlling device 220 by which that memory module is interfaced to still other electronic components, possibly electronic components making up a computer system.

Figure 2B:
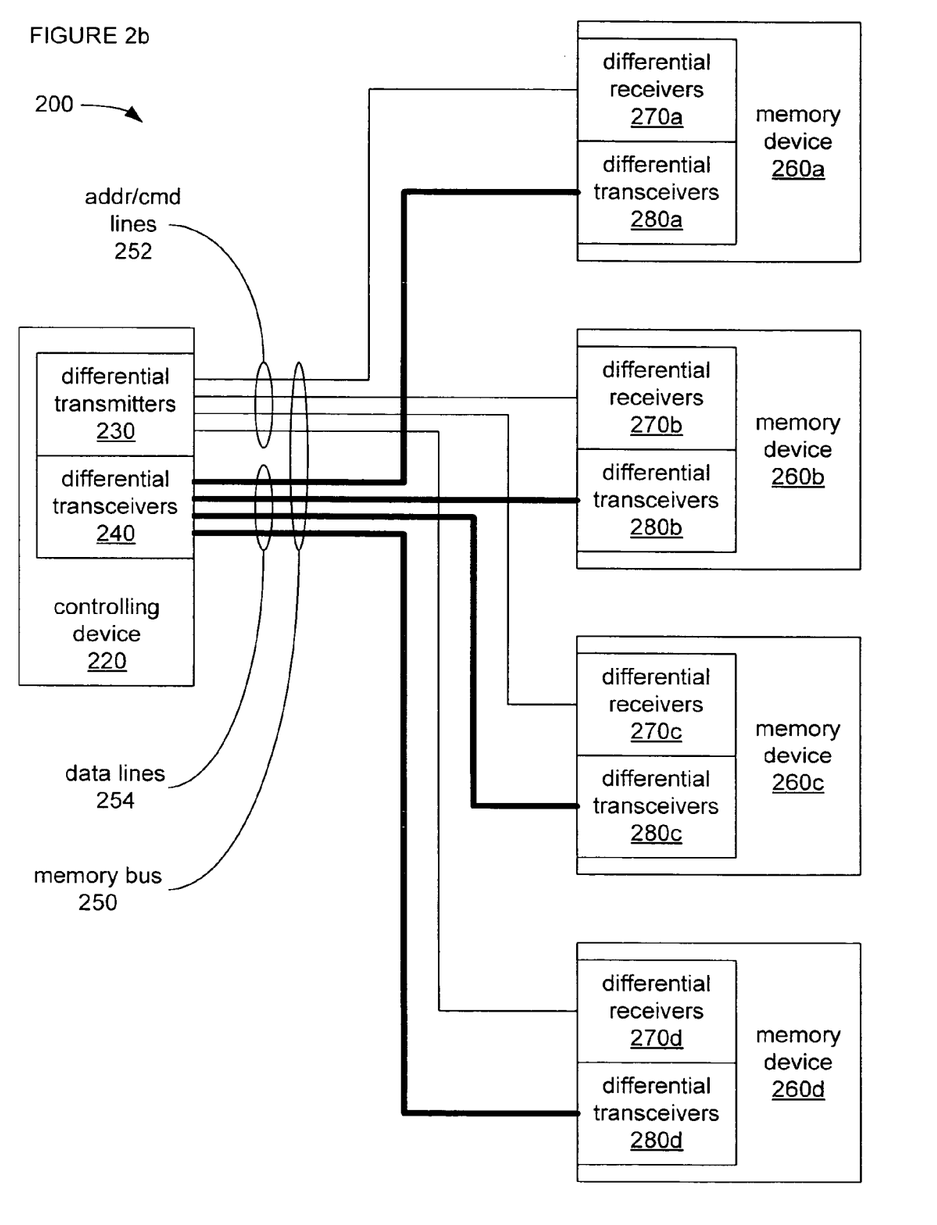
FIG. 2b is a block diagram of an embodiment of a memory system employing differential point-to-point signals.

Controlling device 220 provides a memory bus 250 made up, at least in part, of address/command lines 252 and data lines 254. As depicted in FIG. 2a, address/command lines 252 follow a multi-drop topography by which at least the majority of address/command lines 252 couple controlling device 220 to all of memory devices 260a through 260d, while separate sets of data lines among data lines 254 separately couple controlling device 220 to each of memory devices 260a through 260d. As those skilled in the art will readily recognize, this a common topography of signal lines within a memory system, but those skilled in the art will also recognize that other topographies may be resorted to without departing from the spirit and scope of the invention as hereinafter claimed. By way of example, memory system 200 of FIG. 2b, is a simplified diagram of an embodiment of a memory system that is substantially similar to memory system 200 of FIG. 2a, but with separate sets of address/command lines 252 separately coupling controlling device 220 to each of memory devices 260a through 260d, thereby depicting, in some possible embodiments, a set of individual point-to-point connections between controlling device 220 and each of memory devices 260a through 260d. Indeed, those skilled in the art of the design of memory systems will readily recognize that FIGS. 2a and 2b depict relatively simple memory systems representing but a tiny sampling of the possible configurations of memory systems that may be implemented, and that many alternate embodiments are possible in which the exact arrangement and configuration of components may be reduced, augmented or otherwise altered without departing from the spirit and scope of the present invention as hereinafter claimed.

In both FIGS. 2a and 2b, controlling device 220 initiates and controls memory operations carried out on memory devices 260a-d across memory bus 250 to both store and retrieve information, as well as other functions to maintain the integrity of stored information (e.g., memory refresh). In some embodiments, address/command lines 252 are made up, at least in part, of distinct control signals by which controlling device 220 initiates and controls such memory operations, while in other embodiments, the equivalent of control signals may be embedded in transmitted packets and/or implied by the order in which commands are transmitted, or in still other ways, as those skilled in the art will readily recognize. In some embodiments, controlling device 220 may either be a processor or may have processing elements whereby the memory operations carried out by controlling device 220 to store and retrieve data and/or instructions are largely for its own use. In other embodiments, controlling device 220 may be a memory controller and/or a buffering device between another device coupled to controlling device 220 (not shown) and memory devices 260a-d, wherein controlling device 220 carries out memory operations in response to commands to store and/or retrieve information received by controlling device 220 from such other device.

As depicted in FIG. 2a, controlling device 220 is made up, at least in part, of single-ended transmitters 230 by which controlling device 220 is coupled to at least some of address/command lines 252, and differential transceivers 240 (each of which is made up of a transmitter and a receiver) by which controlling device is coupled to at least some of data lines 254. Correspondingly, each of memory devices 260a-d is made up, at least in part, of single-ended receivers 270a-d, respectively, by which all of memory devices 260a-d are coupled to at least some of address/command lines 252. Despite this depiction of the use of single-ended signaling for the transfer addresses and commands, alternate embodiments may employ other signaling techniques, including differential signaling. Furthermore, each of memory devices 260a-d is made up, at least in part, of differential transceivers 280a-d (each of which is made up of a transmitter and a receiver), respectively, by which each of memory devices 260a-d are coupled to some of the data lines making up data lines 254. More simply, controlling device 220 is coupled to memory devices 260a-d with single-ended signal lines that convey addresses and commands from controlling device 220 to all of memory devices 260a-d, and with differential signal lines that allow data to be exchanged between controlling device 220 and each of memory devices 260a-d. In some embodiments, the use of differential signaling for the transfer of data alongside the use of single-ended signaling for addresses in commands may be done in recognition of their being large enough latencies in the response of memory devices 260a-d (depending on the type of memory technology used) to changes in addresses (to close and/or activate rows, etc.) that the transfers of addresses and/or commands may be carried out at a slower pace than the transfer of data with little or no impact on the speed at which memory operations may be carried out, and therefore, there is little to be gained by requiring the greater complexities of employing differential signaling for addresses and/or commands, as well as data.

In some embodiments, the core voltage of controlling device 220 is lower than at least the I/O voltage of memory devices 260a-d (the core voltage of memory device 260a-d may be the same as their I/O voltage, or may be higher still). This may arise as a result of differing processing technologies between controlling device 220 and memory devices 260a-d, possibly as a result of one processing technology that is more amenable to the fabrication of digital logic being chosen for fabricating controlling device 220, while a differing processing technology that is more amendable to the fabrication of DRAM memory cells is chosen for fabricating memory devices 260a-d. To accommodate this difference in core voltages between controlling device 220 and memory devices 260a-d (such that these two core voltages are said to be "decoupled"), single-ended transmitters 230 and differential transceivers 240 of controlling device 200, as well as single-ended receivers 270a-d and differential transceivers 280a-d employ termination that is referenced to a ground level that is common to all of controlling device 220 and memory devices 260a-d.

Figure 3A:
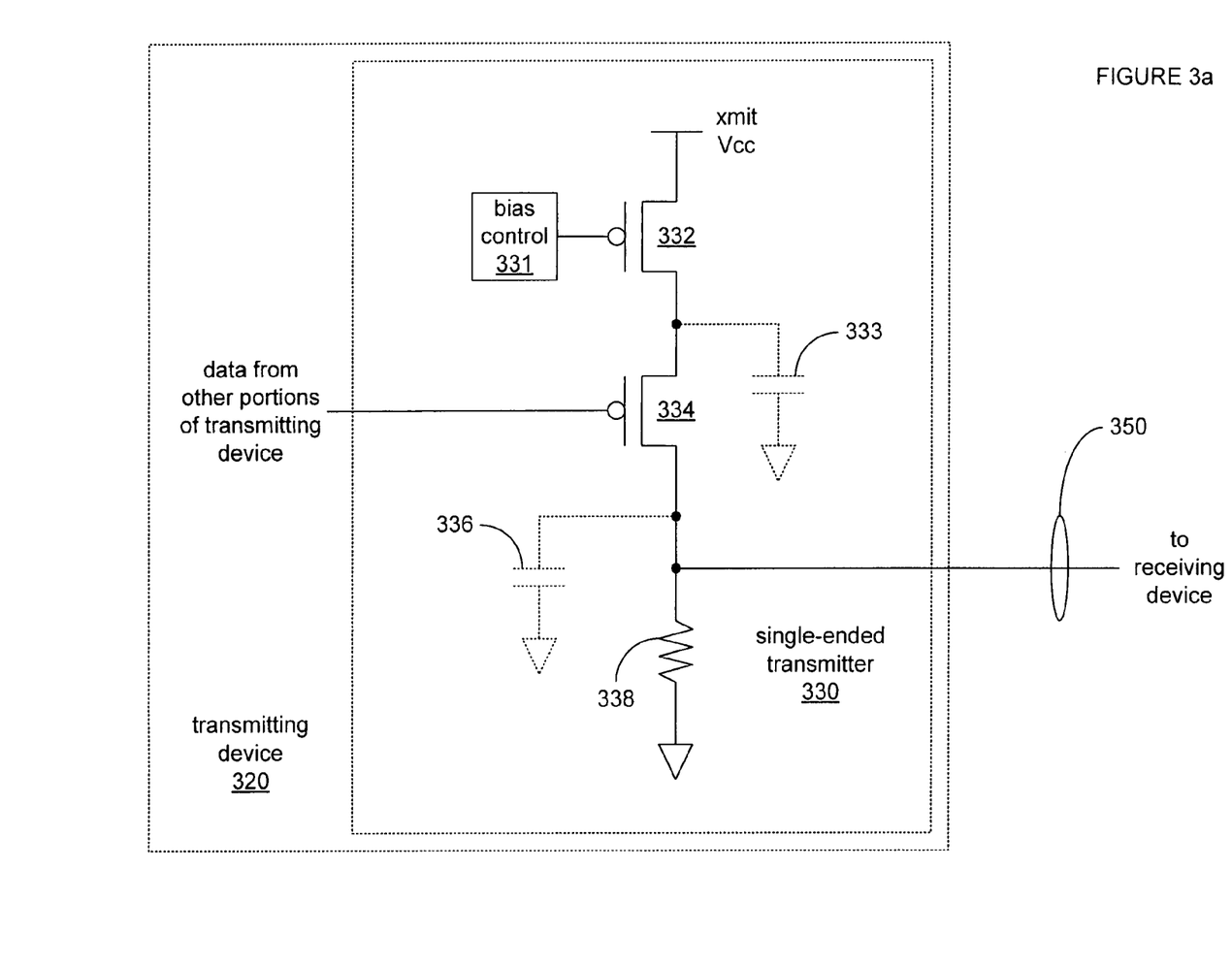
FIG. 3a is a partial schematic diagram of an embodiment employing a single-ended transmitter.

FIG. 3a depicts a partial schematic of a transmitting device having an implementation of a single-ended transmitter that may, in some embodiments, be of the type employed as single-ended transmitters 230 of FIG. 2a to drive addresses and commands onto address/command lines 252 (in which case, transmitting device 320 is controlling device 220). Single-ended transmitter 330 is made up, at least in part, of bias control 331, PMOS switches 332 and 334, and resistor 338. With the source of PMOS switch 332 coupled to the Vcc supply of transmitting device 320, and the gate of PMOS switch 332 coupled to bias control 331, the combination of bias control 331 and PMOS switch 332, together, form a current source, the output of which is provided at the drain of PMOS switch 332. The source of PMOS switch 334 is coupled to the drain of PMOS switch 332 to receive current from the current source just described, the gate of PMOS switch 334 is coupled to other portions of transmitting device 320, and the drain of PMOS switch 334 is coupled to signal line 350 such that PMOS switch 334 drives data that it receives at its gate onto signal line 350. The drain of PMOS switch 334 is further coupled to ground through resistor 338 to provide a ground-referenced termination at the point where signal line 350 is driven by PMOS switch 334.

Also depicted in FIG. 3a are parasitic capacitors 333 and 336. Parasitic capacitor 333 represents the capacitive load placed on the connection of the drain of PMOS switch 332 with the source of PMOS switch 334 by PMOS switch 332 serving as part of a current source, and is a much larger capacitive load than PMOS switch 334 places on signal line 350, which is represented by parasitic capacitor 336. In addition to driving signal line 350, PMOS switch 334 also serves to isolate signal line 350 from the larger capacitive load represented by parasitic capacitor 333 such that signal line 350 is subjected only to the smaller capacitive load represented by parasitic capacitor 336. To keep the parasitic capacitance represented by parasitic capacitor 333 from affecting the capacitance of signal line 350, the extent of the swing of the voltage at the gate of PMOS switch 334 must be limited. Alternatively, keeping the capacitance of parasitic capacitor 333 from affecting the capacitance of signal line 350 may be accomplished by limiting the swing of the voltage of signal line 350 at the point where signal line 350 is coupled to the drain of PMOS switch 334. This isolation of signal line 350 from the larger capacitive load represented by parasitic capacitor 333 aids in allowing the state to which signal line 350 is driven to be switched more quickly, i.e., from a high state to a low state, and vice versa, which in turn allows signal line 350 to be used to transfer a portion of an addresses or command at a faster rate.

Figure 3B:
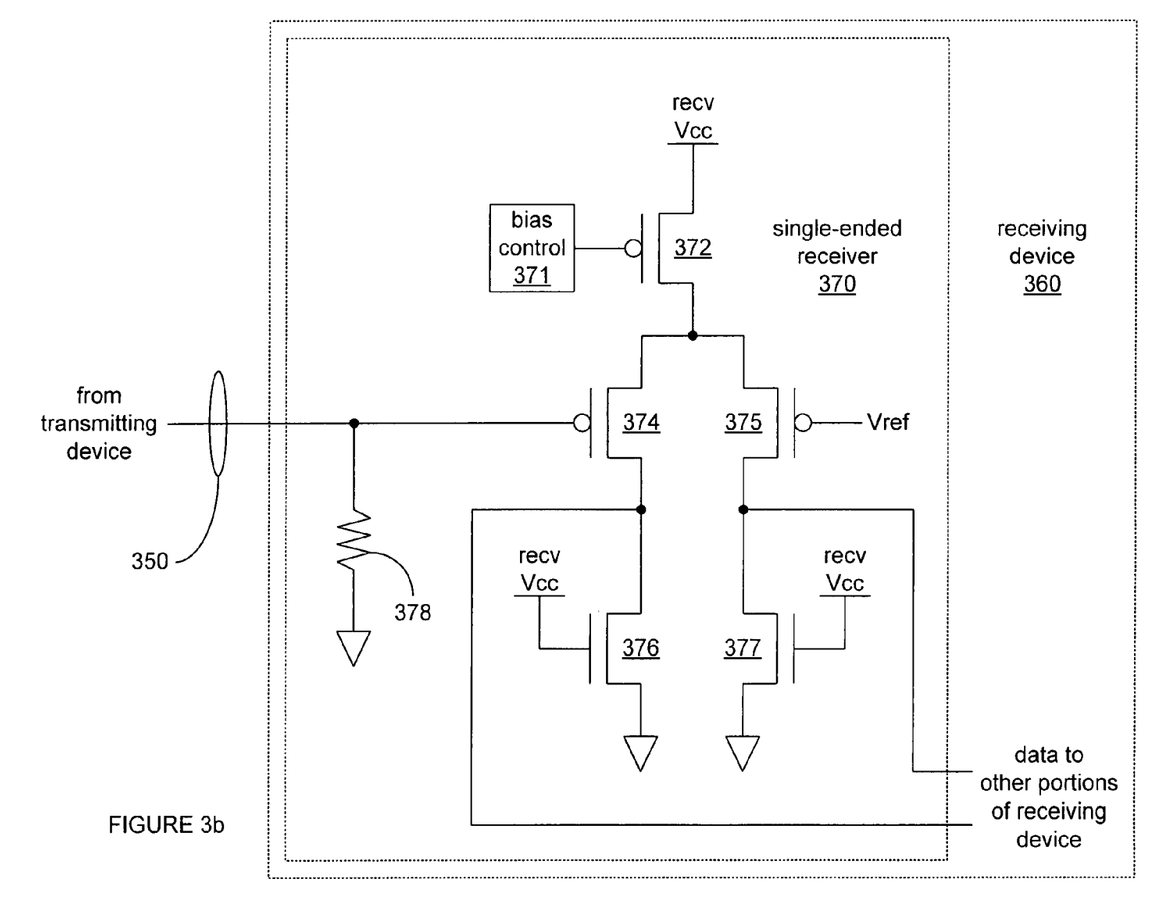
FIG. 3b is a partial schematic diagram of an embodiment employing a single-ended receiver.

FIG. 3b depicts a partial schematic of a receiving device having an implementation of a single-ended receiver that may, in some embodiments, be of the type employed as single-ended receivers 270a-d of FIG. 2a to receive addresses and commands from address/command lines 252 (in which case, receiving device 360 is one of memory devices 260a-d). Single-ended receiver 370 is made up, at least in part, of PMOS switches 372, 374 and 375; active loads 376 and 377; and resistor 378. With the source of PMOS switch 372 coupled to the Vcc supply of receiving device 360, and the gate of PMOS switch 372 coupled to bias control 371, the combination of bias control 371 and PMOS switch 372, together, form a current source, the output of which is provided at the drain of PMOS switch 372. The sources of PMOS switches 374 and 375 are coupled to the drain of PMOS switch 372 to receive current from the current source just described, the gate of PMOS switch 374 is coupled to signal line 350, the gate of PMOS switch 375 is coupled to a reference voltage, and the drains of switches 374 and 375 are coupled to other portions of receiving device 360. Also, the drains of PMOS switches 374 and 375 are coupled to the drains of active loads 376 and 377, respectively, with the gates of both active loads 376 and 377 being coupled to the Vcc supply of receiving device 360, and with the sources of both active loads 376 and 377 being coupled to ground. In this configuration, PMOS switches 374 and 375 compare the voltage level received from across signal line 350 to the voltage level of the reference voltage coupled to the gate of PMOS switch 375 to determine if signal line 350 is being driven by a single-ended transmitter to a high or low state. The gate of PMOS switch 374 is further coupled to ground through resistor 378 to provide a ground-referenced termination at the point where signal line 350 is received by PMOS switch 374.

Referring to both FIGS. 3a and 3b, the referencing of the termination provided by both resistors 338 and 378 to ground in both single-ended transmitter 330 and single-ended receiver 370 allows the voltage levels of the Vcc supply voltages to both transmitting device 320 and receiving device 360 to be entirely separate (or "decoupled") from each other, and in embodiments where both single-ended transmitter 330 and single-ended receiver 370 are coupled to the same signal line 350, the Vcc supply voltage provided to receiving device 360 is able to be greater than the Vcc supply voltage provided to transmitting device 320. It should be noted that the design of single-ended transmitter 330 does not allow signal line 350 to be driven to a voltage level as high as the Vcc supply of transmitting device 320 as a high state. This also means that in embodiments where single-ended transmitter 330 and single-ended receiver 370 are coupled to the same signal line 350, and the Vcc provided to receiving device 360 is greater than that provided to transmitting device 320, the voltage level of the high state to which signal line 350 is able to be driven is likely to be considerably below the voltage level of the Vcc provided to receiving device 360. However, this can be easily accommodated by setting the reference voltage provided to the gate of PMOS switch 375 to a voltage level at a midpoint between the voltage levels of the high and low states to which single-ended transmitter 330 is capable of driving signal line 350, thereby aiding single-ended receiver 370 in distinguishing between those high and low states.

Figure 4A:
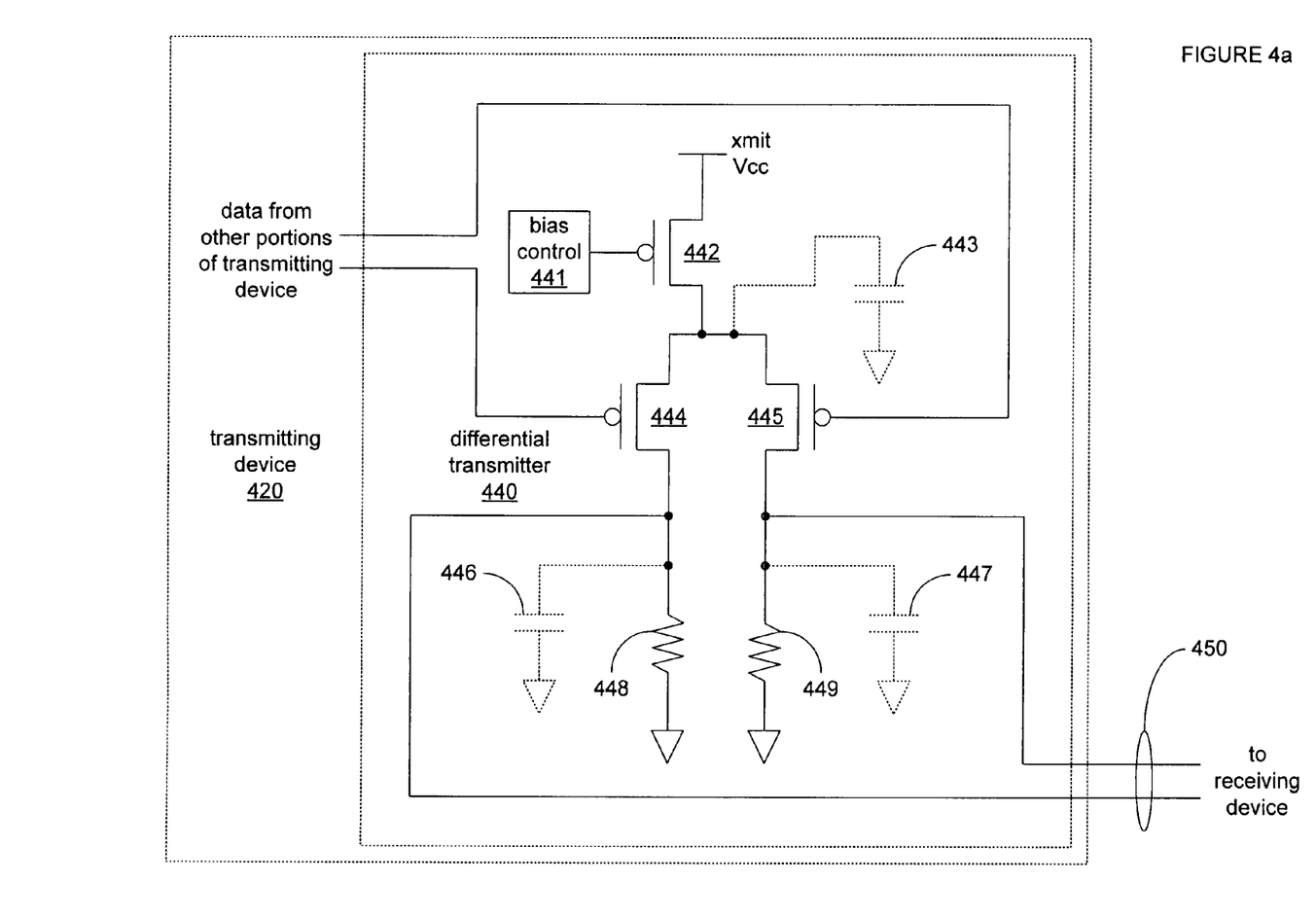
FIG. 4a is a partial schematic diagram of an embodiment employing a differential transmitter.

FIG. 4a depicts a partial schematic of a transmitting device having an implementation of a differential transmitter that may, in some embodiments, be of the type employed as part of differential transceivers 240 of FIG. 2 to drive data onto date lines 254 (in which case, transmitting device 420 is controlling device 220). Differential transmitter 440 is made up, at least in part, of bias control 441, PMOS switches 442, 444 and 445; and resistors 448 and 449. With the source of PMOS switch 442 coupled to the Vcc supply of transmitting device 420, and the gate of PMOS switch 442 coupled to bias control 441, the combination of bias control 441 and PMOS switch 442, together, form a current source, the output of which is provided at the drain of PMOS switch 442. The sources of PMOS switches 444 and 445 are coupled to the drain of PMOS switch 442 to receive current from the current source just described, the gates of PMOS switches 444 and 445 coupled to other portions of transmitting device 420, and the drains of PMOS switches 444 and 445 are coupled to differential signal lines 450 such that PMOS switches 444 and 445 drive data that they receives at their gates onto differential signal lines 450. The drains of PMOS switches 444 and 445 are further coupled to ground through resistors 448 and 449, respectively, to provide a ground-referenced termination at the point where each one of signal lines 450 are driven by PMOS switches 444 and 445.

Also depicted in FIG. 4a are parasitic capacitors 443, 446 and 447. Parasitic capacitor 443 represents the capacitive load placed on the connection of the drain of PMOS switch 442 with the source of PMOS switches 444 and 445 by PMOS switch 442 serving as part of a current source, and is a much larger capacitive load than either PMOS switch 444 or 445 places on differential signal lines 450, which is represented by parasitic capacitors 446 and 447, respectively. In addition to driving differential signal lines 450, PMOS switches 444 and 445 also serve to isolate differential signal lines 450 from the larger capacitive load represented by parasitic capacitor 443 such that differential signal lines 450 are subjected only to the smaller capacitive loads represented by parasitic capacitors 446 and 447, respectively. To keep this parasitic capacitance represented by parasitic capacitor 443 from affecting the capacitance on signal lines 450, the extent of the swing of the voltage at the gates of PMOS switches 444 and 445 must be limited. Alternatively, keeping the capacitance of parasitic capacitor 443 from affecting the capacitance of signal lines 450 may be accomplished by limiting the swing of the voltage of each of signal lines 450 at the point where each of signal lines 450 is coupled to their respective drains of PMOS switches 444 and 445. This isolation of differential signal line 450 from the larger capacitive load represented by parasitic capacitor 443 aids in allowing the state to which differential signal line 450 is driven to be switched more quickly, i.e., from a high state to a low state, and vice versa, which in turn allows differential signal lines 450 to be used to transfer a portion of data at a faster rate.

Figure 4B:
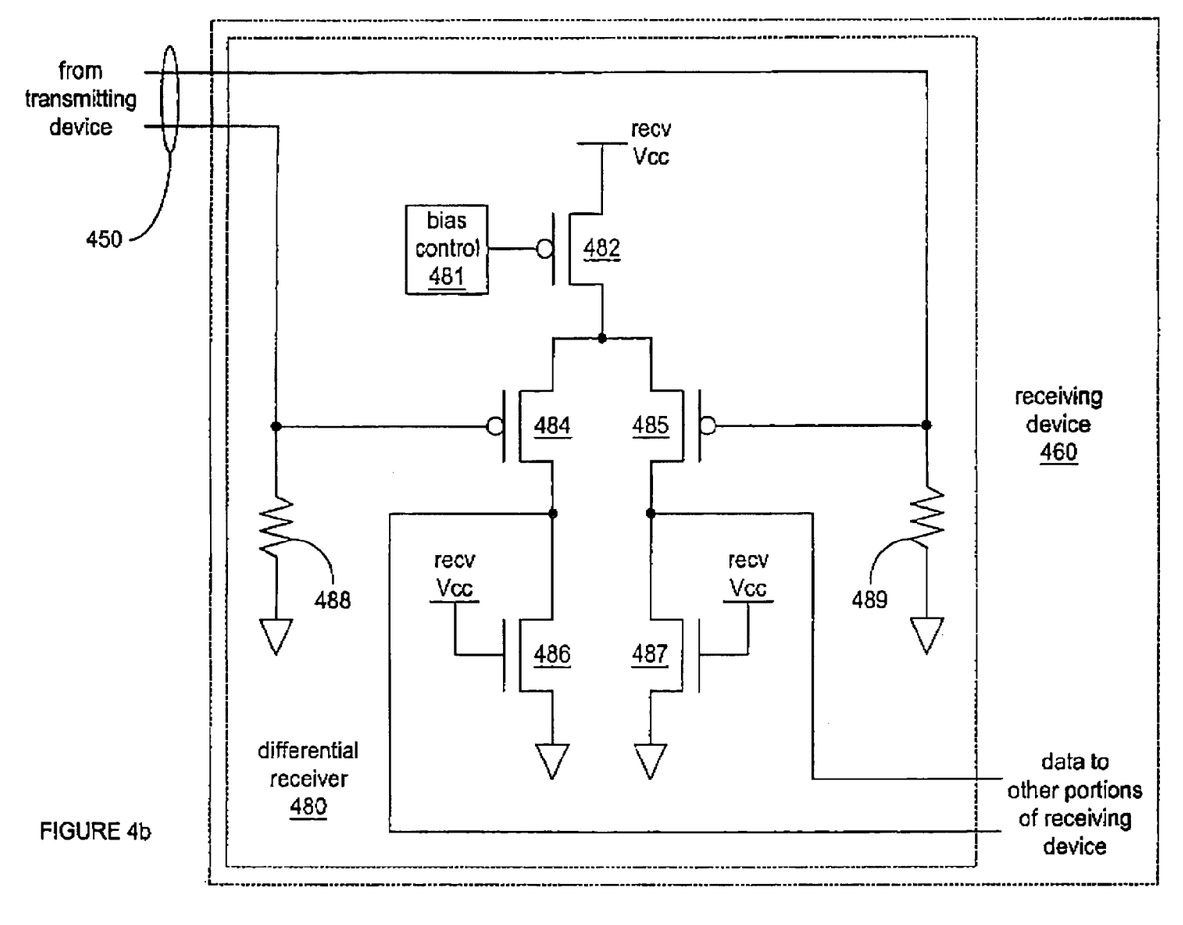
FIG. 4b is a partial schematic diagram of an embodiment employing a differential receiver.

FIG. 4b depicts a partial schematic of a receiving device having an implementation of a differential receiver that may, in some embodiments, be of the type employed as part of differential transceivers 280a-d of FIG. 2 to receive data from data lines 254 (in which case, receiving device 460 is one of memory devices 260a-d). Differential receiver 480 is made up, at least in part, of PMOS switches 482, 484 and 485; active loads 486 and 487; and resistors 488 and 489. With the source of PMOS switch 482 coupled to the Vcc supply of receiving device 460, and the gate of PMOS switch 482 coupled to bias control 481, the combination of bias control 481 and PMOS switch 482, together, form a current source, the output of which is provided at the drain of PMOS switch 482. The sources of PMOS switches 484 and 485 are coupled to the drain of PMOS switch 482 to receive current from the current source just described, the gates of PMOS switches 484 and 485 are each coupled to one of differential signal lines 450, and the drains of switches 484 and 485 are coupled to other portions of receiving device 460. Also, the drains of PMOS switches 484 and 485 are coupled to the drains of active loads 486 and 487, respectively, with the gates of both active loads 486 and 487 being coupled to the Vcc supply of receiving device 460, and with the sources of both active loads 486 and 487 being coupled to ground. In this configuration, PMOS switches 484 and 485 compare the voltage levels received from across differential signal lines 450 to determine if a high or low value is being driven transmitted across differential signal lines 450. The gates of PMOS switch 484 and 485 are further coupled to ground through resistors 488 and 489 to provide a ground-referenced termination at the point where each one of differential signal lines 450 are received by PMOS switches 484 and 485, respectively.

Referring to both FIGS. 4a and 4b, in a manner not unlike single-ended transmitter 330 and single-ended receiver 370 of FIGS. 3a and 3b, the referencing of the termination provided by resistors 448, 449, 488 and 489 to ground in both differential transmitter 440 and differential receiver 480 allows the voltage levels of the Vcc supply voltages to both transmitting device 420 and receiving device 460 to be entirely separate (or "decoupled") from each other, and in embodiments where both differential transmitter 440 and differential receiver 480 are coupled to the same differential signal lines 450, the Vcc supply voltage provided to receiving device 460 is able to be greater than the Vcc supply voltage provided to transmitting device 420. It should be noted that just as in the case of single-ended transmitter 330, the design of differential transmitter 440 does not allow either one of differential signal lines 450 to be driven to a voltage level as high as the Vcc supply of transmitting device 420 as a high state. This also means that in embodiments where differential transmitter 440 and differential receiver 480 are coupled to the same differential signal lines 450, and the Vcc provided to receiving device 460 is greater than that provided to transmitting device 420, the voltage level of the high state to which either one of differential signal lines 450 is able to be driven is likely to be considerably below the voltage level of the Vcc provided to receiving device 460. However, this use of differential signaling easily accommodates this situation since the voltage levels of each one of the differential signal lines 450 will be compared against the other to distinguish between a high value and a low value being transferred across differential signal lines 450.

The invention has been described in some detail with regard to various possible embodiments. It is evident that numerous alternatives, modifications, variations and uses will be apparent to those skilled in the art in light of the foregoing description. It will be understood by those skilled in the art that the present invention may be practiced in support of many possible types of memory devices employing any of a number of possible memory technologies. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. An apparatus comprising:
   a power supply to provide a first voltage;
   a first Positive-channel Metal Oxide Semiconductor (PMOS) switch, the first PMOS switch including a source to couple to the first supply voltage;
   a first bias control to couple to a gate of the first PMOS switch;
   a first signal line;
   a portion of a transmitting device having an output;
   a second PMOS switch having a source to couple to a drain of the first PMOS switch, a gate input to couple to the output of the portion of the transmitting device, and a drain to couple to the first signal line;
   a first resistor to terminate the first signal line with reference to ground;
   a third PMOS switch, the third PMOS switch including a source to couple to the power source to receive a second supply voltage;
   a second bias control to couple to a gate of the third PMOS switch;
   a portion of a receiving device;
   a first active load having a source to couple to ground, a gate input to couple to the second supply voltage and a drain to couple to the portion of the receiving device;
   a second active load having a source to couple to ground, a gate input to couple to the second supply voltage and a drain to couple to the portion of the receiving device;
   a fourth PMOS switch having a source to couple to a drain of the third PMOS switch, a gate input to couple to the first signal line, and a drain to couple to the drain of the first active load;
   a fifth PMOS switch having a source to couple to the drain of the third PMOS switch, a gate input to couple to a reference voltage, and a drain to couple to the drain of the second active load; and
   a second resistor to terminate the first signal line with reference to ground, wherein the first and second resistors decouple the first supply voltage from the second supply, and wherein the second supply voltage is greater than the first supply voltage.

2. The apparatus of claim 1, wherein the receiving device includes a memory device to store a piece of data, the gate input of the second PMOS switch to receive a bit of a binary address indicating a location within the receiving device into which the piece of data is to be stored, and the second PMOS switch to drive the bit of binary address onto the first signal line.

3. The apparatus of claim 1, wherein the receiving device is a memory device to store a piece of data, the gate input of the second PMOS switch to receive a command signal indicating an action to be carried out by the receiving device, and the second PMOS switch to drive the command signal onto the first signal line.

4. An apparatus comprising:
   a power supply to provide a first supply voltage;
   a first Positive-channel Metal Oxide Semiconductor (PMOS) switch, the first PMOS switch including a source to couple to the first supply voltage;
   a bias control to couple to a gate of the first PMOS switch;
   a first signal line;
   a second signal line;
   a portion of a transmitting device having an output and an inverted output;
   a second PMOS switch having a source to couple to a drain of the first PMOS switch, a gate input to couple to the output of the portion of the transmitting device, and a drain to couple to the first signal line;
   a third PMOS switch having a source to couple to the drain of the first PMOS switch, a gate input to couple to the inverted output of the portion of the transmitting device, and a drain to couple to the second signal line;
   a first resistor to terminate the first signal line with reference to ground;
   a second resistor to terminate the second signal line with reference to ground;
   a fourth PMOS switch, the fourth PMOS switch including a source to couple to the power source to receive a second supply voltage;
   a second bias control to couple to a gate of the fourth PMOS switch;
   a portion of a receiving device;
   a first active load having a source to couple to ground, a gate input to couple to the second supply voltage and a drain to couple to the portion of the receiving device;
   a second active load having a source to couple to ground, a gate input to couple to the second supply voltage and a drain to couple to the portion of the receiving device;
   a fifth PMOS switch having a source to couple to a drain of the fourth PMOS switch, a gate input to couple to the first signal line, and a drain to couple to the drain of the first active load;
   a sixth PMOS switch having a source to couple to the drain of the fourth PMOS switch, a gate input to couple to the second signal line, and a drain to couple to the drain of the second active load:
   a third resistor to terminate the first signal line with reference to ground; and
   a fourth resistor to terminate the second signal line with reference to ground, wherein the first, second, third, and fourth resistors decouple the first supply voltage from the second supply, and wherein the second supply voltage is greater than the first supply voltage.

5. The apparatus of claim 4, wherein the receiving device includes a memory device to store a piece of data, the gate input of the second PMOS switch to receive a bit of a binary data to be stored within the receiving device, the gate input of the third PMOS switch to receive the bit of binary data in inverted form, the second PMOS switch to drive the bit of binary data onto the first signal line and the third PMOS switch to drive the bit of binary data onto the second signal line in inverted form.

* * * * *